United States Patent
Walmsley

(10) Patent No.: US 10,342,175 B2
(45) Date of Patent: Jul. 9, 2019

(54) VEGETATION CUTTING DEVICE

(71) Applicant: BLACK & DECKER INC., Newark, DE (US)

(72) Inventor: Neil Walmsley, Durham (GB)

(73) Assignee: Black & Decker, Inc., Newark, DE (US)

(*) Notice: Subject to any disclaimer, the term of this patent is extended or adjusted under 35 U.S.C. 154(b) by 570 days.

(21) Appl. No.: 14/265,922

(22) Filed: Apr. 30, 2014

(65) Prior Publication Data
US 2014/0325852 A1     Nov. 6, 2014

(30) Foreign Application Priority Data

May 3, 2013   (EP) ..................... 13166381

(51) Int. Cl.
| | | |
|---|---|---|
| *A01D 34/00* | (2006.01) | |
| *A01D 34/416* | (2006.01) | |
| *A01D 34/84* | (2006.01) | |
| *A01D 34/90* | (2006.01) | |

(52) U.S. Cl.
CPC ..... *A01D 34/4161* (2013.01); *A01D 34/4162* (2013.01); *A01D 34/84* (2013.01); *A01D 34/902* (2013.01)

(58) Field of Classification Search
CPC .................................................. A01D 34/84
USPC ................. 56/12.7; 30/276, DIG. 5
See application file for complete search history.

(56) References Cited

U.S. PATENT DOCUMENTS

| | | | |
|---|---|---|---|
| 1,467,212 A * | 9/1923 | Walsh ................. | A01D 76/006 56/400.14 |
| 4,756,148 A | 7/1988 | Gander et al. | |
| 4,835,867 A * | 6/1989 | Collins ............. | A01D 34/4162 30/276 |
| 4,894,916 A | 1/1990 | Nimz et al. | |
| 5,107,665 A | 4/1992 | Wright | |
| 5,156,217 A | 10/1992 | Hirata et al. | |
| 5,228,276 A * | 7/1993 | Miller ........................... | 56/12.1 |
| 5,263,303 A * | 11/1993 | Stroud .......................... | 56/12.7 |
| 5,351,762 A * | 10/1994 | Bean ............................. | 172/17 |
| 5,477,665 A * | 12/1995 | Stout ............................. | 56/16.7 |
| 5,577,374 A | 11/1996 | Huston | |

(Continued)

FOREIGN PATENT DOCUMENTS

DE        29819468        2/1999

*Primary Examiner* — Thomas B Will
*Assistant Examiner* — Mai T Nguyen
(74) *Attorney, Agent, or Firm* — John Yun

(57) ABSTRACT

A vegetation cutting device comprises: a rotating cutting head and having a cutting line, the cutting line arranged to define a swath for cutting vegetation. A cutting line feeding mechanism comprises a counterweight for balancing a free end of the cutting line protruding from the cutting head, the counterweight being configured to actuate the cutting line feeding mechanism and feed more cutting line when the length of free end the cutting line is shorter than or equal to a feed length. A guide wheel is mounted on the vegetation cutting device and has an outer surface for engaging the ground. The guide wheel is moveable between a retracted position and an extended position wherein when the guide wheel is in the retracted position, the feed length is substantially equal to a distance between the outer surface of the guide wheel engaging the ground and the cutting head.

11 Claims, 6 Drawing Sheets

(56) References Cited

U.S. PATENT DOCUMENTS

| | | |
|---|---|---|
| 5,862,655 A | 1/1999 | Altamirano et al. |
| 5,940,973 A * | 8/1999 | Kitz ............................ 30/276 |
| 6,345,489 B1 * | 2/2002 | Everts et al. ................. 56/12.7 |
| 6,351,930 B1 * | 3/2002 | Byrne ........................... 56/12.7 |
| 6,363,699 B1 | 4/2002 | Wang |
| 6,604,349 B2 | 8/2003 | Deal |
| 6,691,792 B2 | 2/2004 | Keane |
| 6,941,738 B1 * | 9/2005 | Standish ...................... 56/12.7 |
| 7,584,542 B2 * | 9/2009 | Smith ............................ 30/276 |
| 7,594,379 B2 | 9/2009 | Nicholson et al. |
| 7,877,971 B1 | 2/2011 | Halliman et al. |
| 2003/0079455 A1 * | 5/2003 | Suchdev et al. .............. 56/16.9 |
| 2008/0230240 A1 * | 9/2008 | Hurley ........................... 172/14 |
| 2010/0031515 A1 * | 2/2010 | Hurley ........................... 30/276 |
| 2012/0180445 A1 * | 7/2012 | Duller ........................... 56/12.7 |

\* cited by examiner

VEGETATION CUTTING DEVICE

This application claims priority to European Patent Application No. 13 166 381.7 filed May 3, 2013. The entire contents of that application are expressly incorporated herein by reference.

FIELD OF THE INVENTION

The present invention relates to a vegetation cutting device. In particular the present invention relates to a vegetation cutting device with a wheel.

BACKGROUND OF THE INVENTION

Vegetation cutting devices such as string trimmers are known power operated tools for cutting grass and other foliage and vegetation. Typically string trimmers are powered by petrol or electricity and an engine or motor drives a cutting head. The cutting head can comprise one or more rotating blades, in which case the trimmer is generally known as a brush cutter or one or more rotating lines, in which case it is known as a string trimmer. Many types of vegetation cutting devices, such as string trimmers employ a mechanism for allowing the user of the string trimmer to operate the string trimmer in a horizontal or "trimming" mode and in a vertical or "edging" mode.

When the string trimmer is in a trimming or horizontal mode, the plane of rotation of the cutting head and the cutting line is in a plane which is generally parallel with the ground. This means that the plane of rotation of the cutting lines is in an orientation for trimming grass or other vegetation. Typically grass growing in a lawn can be cut when the string trimmer is in the trimming mode.

In contrast when the string trimmer is in an edging mode, the plane of rotation of the cutting head is in a plane which is generally perpendicular to the ground. This means that the plane of rotation of the cutting lines are in an orientation which is suitable for cutting a line in vegetation. Typically grass at the edge of a lawn growing into a flowerbed can be cut when the string trimmer is in edging mode.

When the string trimmer is being operated by the user in the edging mode, a user can find it difficult to maintain the string trimmer in a straight line. For example, some string trimmers require the user to walk behind the string trimmer and parts of the string trimmer can obscure the cutting head from view of the user. Other string trimmers require the user to walk sideways whilst operating the string trimmer. A user can find it particularly difficult to operate the string trimmer and move the string trimmer along the edge of the lawn. Often the user's arms can become tired and the user can have trouble holding the cutting head up off the ground.

It is known to provide a wheel attached to the string trimmer which supports the weight of the string trimmer during use in edging mode. U.S. Pat. No. 4,756,148 discloses a manually retractable wheel on a string trimmer. The wheel can be moved to a desired position and fixed in place when in edging mode and then stowed away when not required. A problem with U.S. Pat. No. 4,756,148 is that the user may choose not to deploy the wheel during edging mode. For example a user may become fed up with deploying the wheel the user repeatedly alternates between using the string trimmer in trimming mode and edging mode.

DE 298 19 468 discloses another string trimmer which can be used to clean crevices when in edging mode. The string trimmer has a wheel mounted on the string trimmer with a resilient suspension bracket. A problem with this string trimmer is that a user is able to force the cutting head of the string trimmer right up against the vegetation when in edging mode.

Wire guides are also known for string trimmers. A retractable piece of wire is attached to the housing and is extended when the string trimmer is used in edging mode. The wire acts as a guide for the string trimmer in edging mode and helps support the weight of the string trimmer. Similarly the user can forget or simply not be bothered to use the wire. When the cutting head of the string trimmer is forced up against vegetation, the string trimmer will not cut properly or can even become damaged.

A string trimmer which improves the cutting efficiency of the string trimmer and prevents the user damaging the string trimmer in edging mode is desirable. Embodiments of the present invention aim to address the aforementioned problems.

BRIEF SUMMARY OF THE INVENTION

According to an aspect of the present invention there is a vegetation cutting device comprising: a rotating cutting head and having a cutting line, the cutting line arranged to define a swath for cutting vegetation; a cutting line feeding mechanism comprising a counterweight for balancing a free end of the cutting line protruding from the cutting head, the counterweight being configured to actuate the cutting line feeding mechanism and feed more cutting line when the length of free end the cutting line is shorter than or equal to a feed length; and a guide wheel mounted on the vegetation cutting device and having an outer surface for engaging the ground, the guide wheel being moveable between a retracted position and an extended position wherein when the guide wheel is in the retracted position, the feed length is substantially equal to a distance between the outer surface of the guide wheel engaging the ground and the cutting head.

This means that the guide wheel prevents the user forcing the cutting head to abut vegetation or other obstacles. In this way the guide wheel maintains a minimum distance from the axis of rotation of the cutting head. This improves the cutting effectiveness of the cutting line because the cutting line always has a certain cutting length. This means the cutting line travels faster than if the cutting head is forced right up against the vegetation.

The guide wheel also prevents the user from damaging the vegetation cutting device. Some vegetation cutting device cutting heads rely on an automatic cutting line feeding mechanism. One such automatic feeding mechanism relies on a dynamically balanced automatic cutting line feeding mechanism whereby a counterweight balances a predetermined length and mass of cutting line when the cutting head is rotating. The predetermined length of cutting line sweeps out an ideal cutting swath which is usually similar in radius to the guard of the string trimmer. If a portion of the cutting line breaks, the counterweight in the cutting line feeding mechanism is no longer balanced and the counterweight moves thereby actuating the feeding mechanism and more cutting line is fed out. The cutting line is fed out until the mass of the cutting line balances the counterweight and the counterweight moves back to its original position and the cutting line feed mechanism is stopped.

A user can disrupt a dynamically balanced automatic cutting line feeding mechanism by pushing the cutting line up against vegetation or another solid object. When the line is pushed against another object, the weight of the line may no longer be acting to balance against the counterweight. This means that the counterweight may move and actuate the cutting line feeding mechanism whilst the cutting head is forced right up against the vegetation. Consequently cutting line can be continuously fed out until the user moves the cutting head away from the vegetation. At this point far too much line can be fed out and this can damage the motor in addition to the line becoming wound round the vegetation cutting device.

The guide wheel prevents the user from disrupting the dynamically balanced feed mechanism because the guide wheel prevents the user from pushing the cutting head too close to the vegetation. The guide wheel ensures that the guide wheel extends beyond a distance equal to the length of the cutting line below which more cutting line is fed out. In this way cutting line is only fed out by the automatic cutting line feeding mechanism when the line breaks.

Preferably the vegetation cutting device comprises a guard and the outer surface of the guide wheel in the extended position is configured to be at a radius substantially equal to the radius of the guard. The guard may have a blade mounted at one edge to ensure that the swath of the cutting line is the same radius as the guard. The cutting line will have a maximum length equal to the radius of the guard. By having the outer surface of the guide wheel which touches the ground at a distance from the center of the cutting head which is equal to the radius of the guard, the cutting line at the maximum length will still be able to cut the vegetation just under the guide wheel in the extended position.

Preferably when the guide wheel is in the extended position, the distance between an outer surface of the guide wheel engaging the ground and the cutting head is greater than the feed length. Preferably the feed length varies within a tolerance length range between a feed length which is equal to a distance between a portion of the outer surface of the guide wheel engaging the ground in the retracted position and the cutting head and a feed length which extends a predetermined distance beyond the outer surface of the guide wheel in the retracted position.

Preferably the guide wheel is biased from the retracted position towards the extended position. The guide wheel may be biased with a spring or any means for biasing the guide wheel. For example the guide wheel can be biased with a resilient rubber element.

In some circumstances the cutting line can break to leave a rotating portion of cutting line which is less than the maximum cutting line length and more than the dispensing or feeding length of the cutting line. At this length, the cutting line will sweep a swath which is less that the swath of maximum radius. This means that when the guide wheel is fully extended there will be vegetation at a certain height at which the cutting line will not be able to cut. The sprung biased guide wheel allows the user to press the vegetation cutting device down and move the guide wheel towards the retracted position. This also moves the cutting line relative to the guide wheel and towards the vegetation. In this way the user can cut vegetation if the cutting line is less than the maximum length of the cutting line.

Preferably the guide wheel is mounted on a guide wheel carrier which slideably couples with a guard mounted on vegetation cutting device. In some embodiments the guide is mounted to the shaft adjacent to the cutting head. The guide wheel carrier may slide within a reciprocating bore within the guard. Alternatively the guide wheel carrier may be slideably coupled to the housing and the guide wheel carrier may slide within a reciprocating bore within the housing.

The vegetation cutting device may comprises a latch mechanism for releasably stowing the guide wheel in the retracted position. Preferably the latch mechanism comprises a user-actuated pedal for operating the latch mechanism. Additionally or alternatively the latch mechanism may be actuated with a button or any means suitable for releasing the latch mechanism. Preferably the latch mechanism comprises a latch mounted on the guard for interlocking with a catch mounted on the guide wheel carrier. The user-actuated pedal may be integral with the latch. The catch can be integral with the guide wheel carrier. Alternatively the latch mechanism comprises a catch mounted on the guard for interlocking with a latch mounted on the guide wheel carrier. The latch may be sprung biased to the locked position. In this way the guide wheel carrier can be pushed into the retracted position until the latch and catch interlock. The user can deploy the guide wheel by depressing the user-actuated pedal.

Preferably the guide wheel is moveable along a path intersecting the axis of rotation of the rotating cutting head. This means that the center of gravity of the cutting head is close to the intersecting path when the string trimmer is in edging mode. Since the center of gravity of the cutting head is close to the intersecting path, the turning moment of the cutting head about the guide wheel is reduced and the vegetation cutting device is easier to use with the guide wheel.

Preferably the rotating cutting head is operable in an edging mode whereby the plane of the swath of the cutting line is substantially vertical and the path is substantially vertical. Additionally or alternatively the guide wheel may be deployable in other orientations of the vegetation cutting device, such as in trimming mode.

BRIEF DESCRIPTION OF THE DRAWINGS

Various other aspects and further embodiments are also described in the following detailed description and in the attached claims with reference to the accompanying drawings, in which:

DETAILED DESCRIPTION OF THE INVENTION

Figure 1:
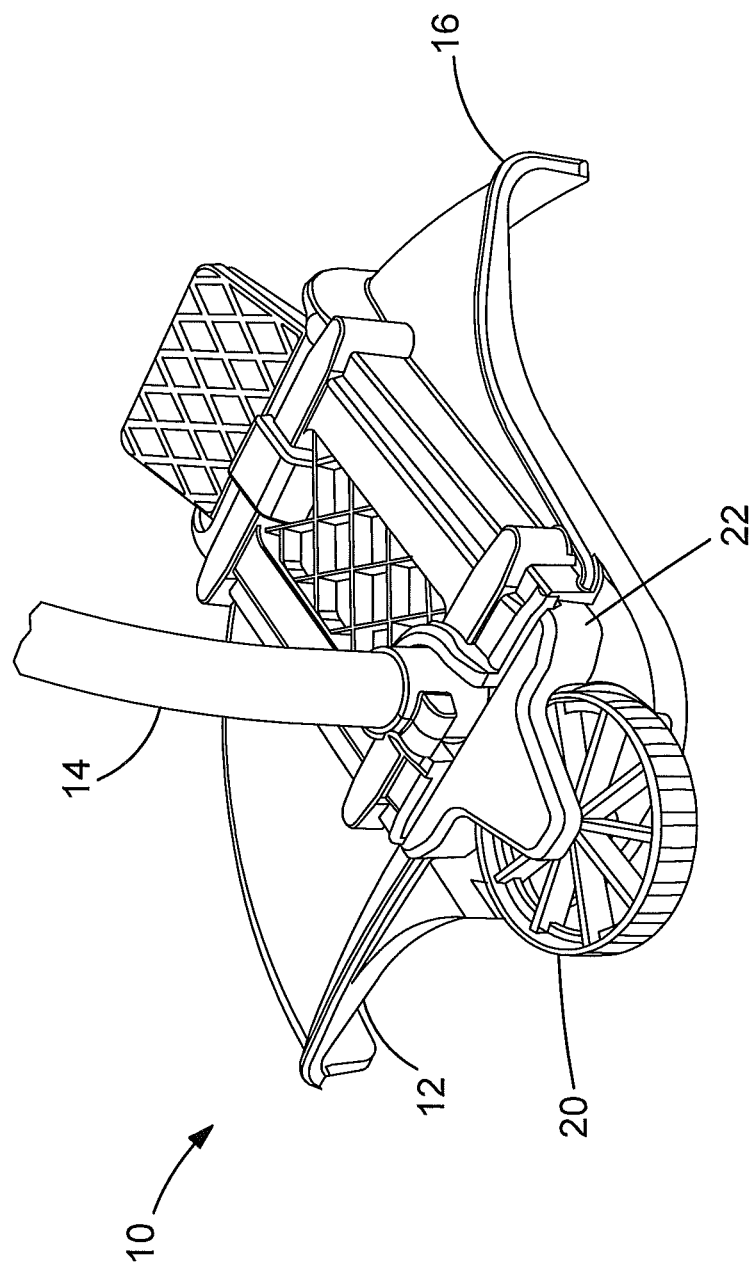
FIG. 1 shows a perspective view of the head of the vegetation cutting device.

FIG. 1 shows a perspective view of a head 12 of a vegetation cutting device or string trimmer 10. Typically the vegetation cutting device 10 is a string trimmer and the term string trimmer will be used hereinafter, but the vegetation cutting device can alternatively be other devices suitable for cutting vegetation. For example the vegetation cutting device can be a lawn mower comprising a cutting line.

Figure 4:
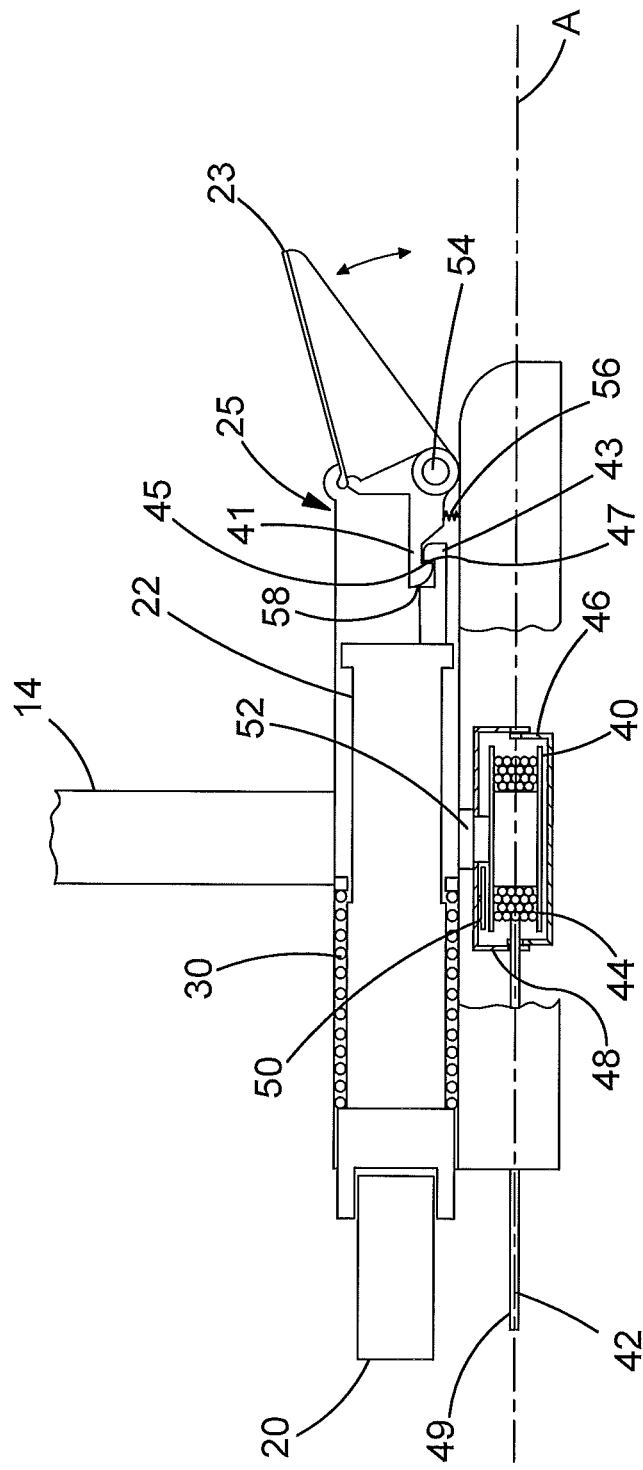
FIG. 4 shows a schematic end-on view of the head of the vegetation cutting device with the guide wheel in the retracted position.

The string trimmer 10 comprises a housing (not shown) for housing a motor (not shown) and other components. The housing can comprise two clam shell portions which are fixed together to enclose the motor and other components. The housing has one or more handles mounted on the housing so that the user can grip and operate the string trimmer 10. The housing is rotatably coupled to a first end (not shown) of a shaft 14 and a head portion 12 is fixed to a second end of the shaft 14. The head portion 12 of the string trimmer 10 is connected to the housing via a shaft 14. The head portion 12 comprises a guard 16 and a cutting head 40 (FIG. 4). A guide wheel 20 is mounted in the guard 16. In some embodiments the head portion 12 can alternatively comprise the motor and housing and the guard 16 is mounted on the housing.

Turning to FIG. 4, which shows a schematic end-on view of the cutting head 40 of the string trimmer 10, the cutting head 40 will be discussed in further detail. The cutting head 40 comprises a removable lower cap portion 46 which can be removed, providing access to the inside of the cutting head 40. The removable lower cap portion 46 slots into an upper spool holder 48. Cutting head 40 may comprise a cutting line 42 such as a flexible line element which is suitable for cutting vegetation. A portion of the cutting line 42 will protrude from the cutting head 40 and define a swathe when the cutting head 40 rotates in operation. The cutting line 42 can be stored on a spool 44 and the spool 44 is rotatably mounted in the upper spool holder 48. The upper spool holder 48 comprises a line feed mechanism 50. In some other embodiments the line feed mechanism 50 is located in the lower cap portion 46. The cutting line 42 is dispensed by the line feed mechanism 50. The line feeding mechanism 50 will described in further detail below. The cutting head 40 is driven by the motor via a drive shaft 52 which extends within the shaft 14.

An exemplary line feeding mechanism will now be discussed. The line feeding mechanism 50 is an automatic line feeding mechanism. In some embodiments the automatic line feeding mechanism can comprise a counterweight for balancing a predetermined length of cutting line 42. The cutting line 42 is fed out if the counterweight and the cutting line are not balanced. In other embodiments any means suitable for automatically feeding cutting line can be used.

Figure 6:
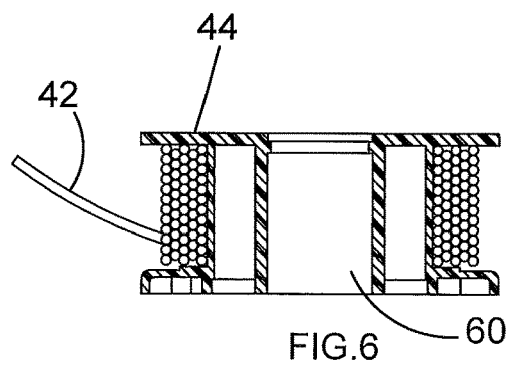
FIG. 6 shows a cross-sectional side view of a spool for the vegetation cutting device.
Figure 7:
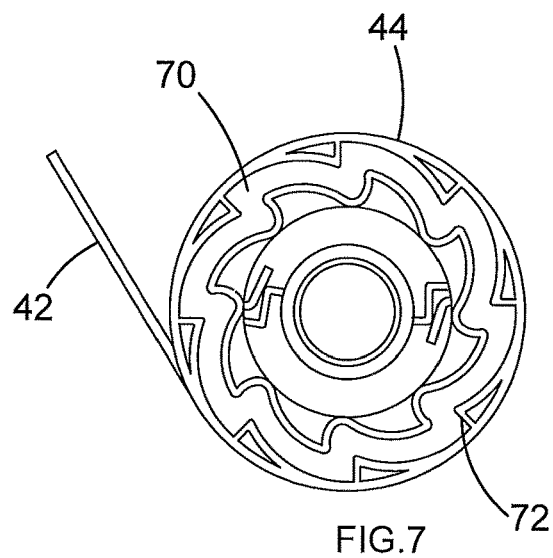
FIG. 7 shows a plan view of the spool for the vegetation cutting device.
Figure 8:
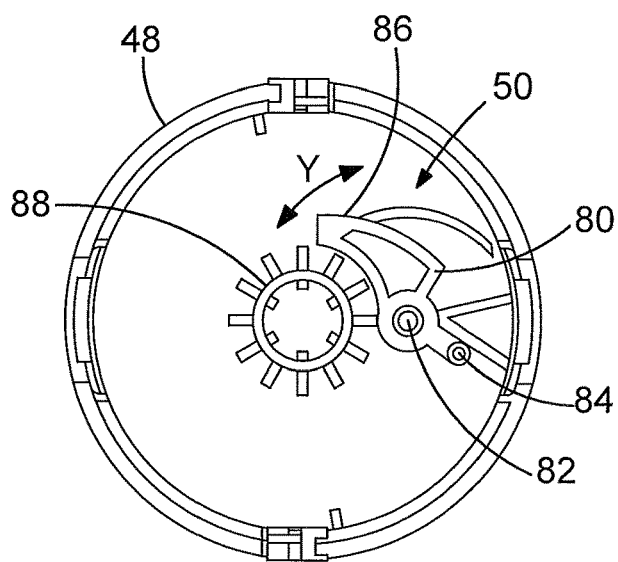
FIG. 8 shows a plan view of the cutting head of the vegetation cutting device.

The line feeding mechanism 50 will now be discussed in reference to FIGS. 6, 7 and 8. FIGS. 6 and 7 respectively show a side cross-sectional view and a plan view of the spool 44. FIG. 8 shows a plan view of the upper spool holder 48 when the spool 44 and the lower cap portion 46 are removed. The line feed mechanism 50 is mounted on the upper spool holder 48. The line feeding mechanism 50 comprises a pivotal arm 80 mounted on the upper spool holder 48 and is pivotable about a protrusion 82. The pivotal arm 80 comprises a counterweight bob 86 for balancing against the free end of the cutting line 42. The pivotable arm 80 further comprises a peg 84 for cooperating and travelling in a reciprocating track 70 on the spool 44. The pivotal arm 80 is capable of pivoting through an arc as indicated by arrows labelled Y.

The upper spool holder 48 comprises a spindle 88 for receiving the spool 44. When the spool 44 is mounted on the upper spool holder 48 the spool 44 is slid on to the spindle 88 and the spindle 88 passes through a bore 60 in the spool 44. The peg 84 of the pivotal arm 80 locates with a track 70 in the top or the base of the spool 48 as shown in FIG. 7. As previously mentioned the cutting line 42 is wound on the spool 44. As the cutting line 42 is pulled off the spool 44, the spool 44 will rotate clockwise. Whilst the spool 44 is capable of rotating about the spindle 88, the rotation of the spool 44 is restricted by the interaction of the peg 84 in the track 70.

When the cutting head 40 rotates, the pivotal arm 80 pivots due to centrifugal force on the counterweight bob 85 and at the same time the peg 84 moves. The counterweight bob 86 will tend to pivot and move towards the periphery of the spool 44. As the counterweight bob 86 moves towards the periphery of the spool 44, the peg 84 moves towards the center of the spool 44.

At the same since a centrifugal force is also exerted on the free end of the cutting line 42 of the spool 44. This generates an "unwinding force" which acts on the spool 44. This results in the cutting line 42 trying to unwind and causing the spool 44 to rotate clockwise as shown in FIG. 7. The spool 44 rotates relative to the upper spool holder 48 and the peg 84. The peg 84 stops the cutting line 42 unwinding when the peg 84 abuts a notch 72 in the track 70. The notch 72 is held in engagement with the peg 84 due to the centrifugal force generated by the cutting head 40 rotating. The peg 84, by virtue of the counterweight bob 86 generates a "biasing force" which acts on the spool 44 and opposes the unwinding force. When the line breaks, the cutting line length can be below a threshold feed length. This means that the unwinding force applied to the spool 44 is reduced due to the reduction in the centrifugal force generated by the cutting line 42. At this point the biasing force of the pivotal arm 80 becomes greater than the unwinding force of the spool 44 and the pivot arm 80 is able to pivot such that the counterweight bob 86 is adjacent the periphery of the spool 44. The peg 84 is then able to move in the track 70 and out of contact with the notch 72. Once the peg 84 becomes disengaged with the notch 72, the spool 44 is able to rotate freely in relation to the upper spool holder 48. This means that the spool 44 feeds out more cutting line 42 as it moves relative to the upper spool holder 48. The spool 44 will stop rotating when sufficient cutting line has been dispensed and the counterweight bob 86 is balanced against the free end of the cutting line 42. In other embodiments any automatic line feeding mechanism can be used.

Returning to FIG. 1 and FIG. 4, basic operation of the string trimmer 10 will be discussed. In operation, the swath of the cutting head 40 will generally be in a plane which hereinafter is referred to as a cutting plane A as shown in FIG. 4. The string trimmer 10 as shown in FIG. 1 or FIG. 4 is configured in a trimming mode whereby the cutting plane A of the cutting head 40 is substantially horizontal. This means that in use the cutting plane A will be substantially parallel with the ground or vegetation to be cut.

The shaft 14 can be rotated with respect to the housing to modify the orientation of the cutting head 40. In some embodiments the shaft 14 can be rotated about an axis which is coaxial with a longitudinal axis of the shaft 14. The shaft 14 can be rotated around the longitudinal axis of the shaft 14 to configure the cutting head 40 in an edging mode. The string trimmer 10 as shown in FIG. 2 is configured in edging mode.

In edging mode the cutting head 40 is substantially vertical and the cutting plane A of the cutting head is substantially perpendicular with the ground. This means that the edges of a lawn at flowerbeds can be trimmed accurately. Indeed in the edging mode, cutting plane A will be perpendicular to cutting plane A as shown in FIG. 1.

The guide wheel 20 aids the user operate the string trimmer 10 in edging mode since the guide wheel 20 supports the weight of the string trimmer 10. This means that the user does not have to support the entire weight of the string trimmer whilst attempting to cut the vegetation neatly, for example trying to move the cutting head in a straight line.

Figure 2:
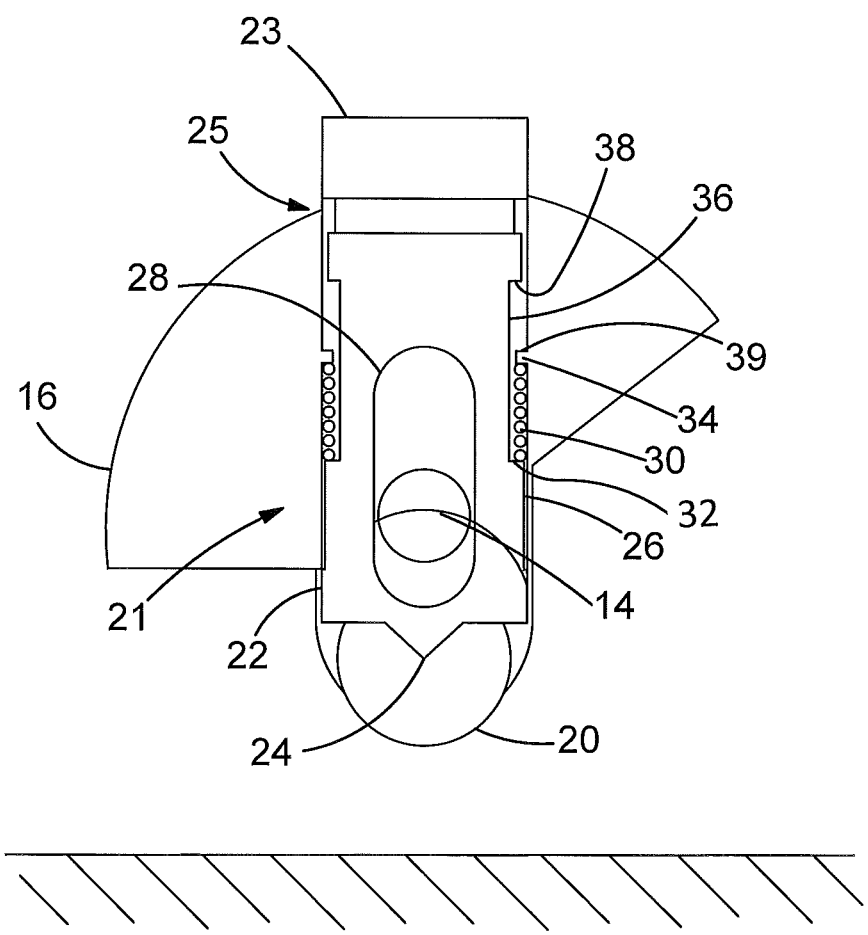
FIG. 2 shows a schematic side view of the head of the vegetation cutting device with the guide wheel in a retracted position.

Turning to FIG. 2, the guide wheel 20 will be discussed in further detail. FIG. 2 shows the head portion 12 of the string trimmer 10 comprising a guide wheel mechanism 21 wherein the guide wheel 20 is in the retracted position. The guide wheel 20 is mounted on the guard 16 via a guide wheel carrier 22. The guide wheel 20 is mounted on the opposite side of the guard 16 to the cutting head 40. This means that the guide wheel 20 does not interfere with the rotating cutting line 42. The guide wheel 20 is coupled to the guide wheel carrier 22 via an axle 24 and the axle 24 permits the guide wheel 20 to freely rotate thereabouts. The guide wheel carrier 22 is slideably mounted in the guard 16 within a conduit 26 formed in the guard 16. The guide wheel carrier 22 can slide within the conduit 26 and permit the guide wheel 20 to move between the retracted position and the extended position. The guide wheel carrier 22 may comprise a linear slot 28 which permits the guide wheel carrier 22 to move relative to the shaft 14.

In some alternative embodiments the slot 28 is not necessary such as when motor is housed in the head portion 12. This means that the shaft 14 does not comprise a drive shaft and the shaft 14 is fixed to the housing meaning that a drive shaft does not have to pass through the guard as shown in FIGS. 1 and 2.

To enable the user to easily deploy the guide wheel 20, the guide wheel mechanism 21 comprises a biasing means 30 to bias the guide wheel 20 from the retracted position to the extended position. In some embodiments the biasing means can be a spring 30. Alternatively or additionally the biasing means can be a resilient member such as a rubber element. FIG. 2 shows a spring 30 which abuts against a first shoulder portion 32 of the guide wheel carrier 22 and a spring abutment protrusion 34 protruding from the wall of the conduit 26. The guide wheel carrier 22 comprises a neck portion 36 which is narrower than the first shoulder portion 32 and a second shoulder portion 38. The guide wheel carrier 22 is retained in the conduit 26 by stop member 39. The stop member 39 is narrower than the second shoulder portion 38 of the guide wheel carrier 22 and the neck portion 36 can move freely past the stop member 39. This means that in the extended position the second shoulder portion 38 abuts against the stop member 39 and the guide wheel carrier is prevented from being ejected from the conduit 26. In some embodiments the spring abutment protrusion 34 and the stop member 39 can be two opposing surfaces of the same protrusion protruding from the wall of the conduit 26. In other embodiments, the spring abutment protrusion 34 and the stop member are separate protrusions protruding from the wall of the conduit 26.

The guide wheel 20 is retained in the retracted position by a latch mechanism 25. The guide wheel 20 can be released from latch mechanism 25 by a user-actuated pedal 23. The latch mechanism 25 will be discussed in relation to FIG. 4. FIG. 4 shows the user actuated pedal 23 in a retaining position whereby a latch portion 41, connected to the pedal 23, engages with a catch portion 43 connected to the carrier 22. Flat opposing and engagable surfaces 45, 47 of the latch portion 41 and the catch portion 43 mean that the latch portion 41 and the catch portion 43 are coupled together until the pedal 23 is operated. When the user operates the pedal 23, the pedal pivots about pivot point 54 and the latch portion 41 lifts away from the catch portion 43. The spring 30 then urges the guide wheel 20 into the extended position. A pedal 23 comprises a spring 56 to bias the pedal 23 into the retaining position. The user can push the guide wheel 20 back into the retracted position by overcoming the biasing force of the spring 30 until the latch portion 41 couples with the catch portion 43. An end of the latch portion may have a curved camming surface 58 to help the latch portion 41 lift up when the catch portion 43 is pushed back into the retracted position.

Figure 3:
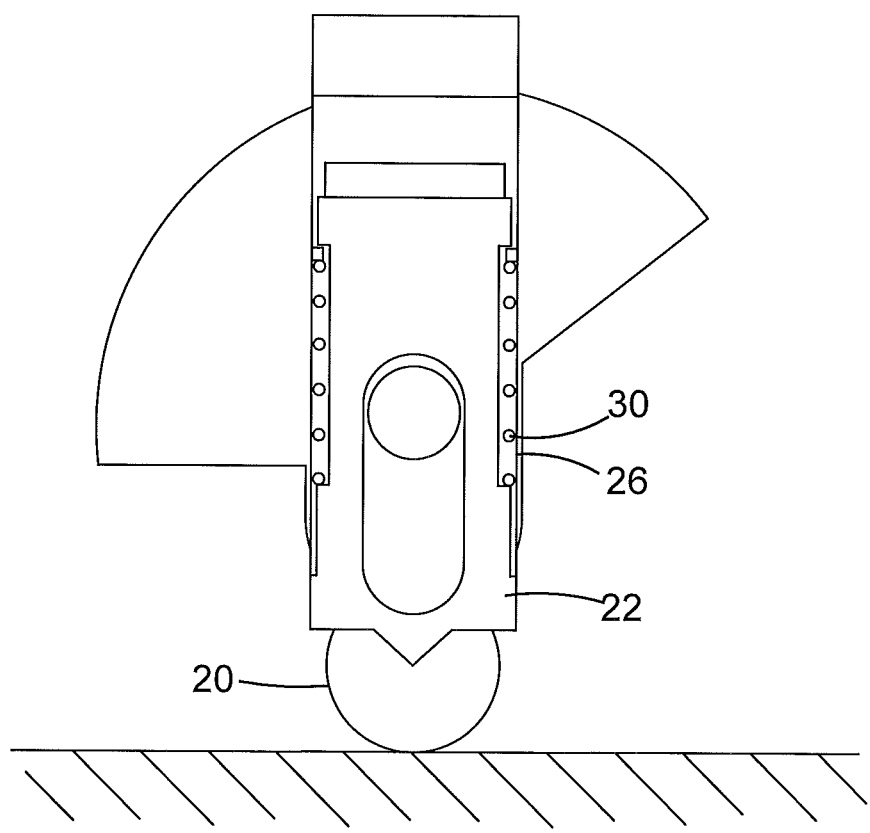
FIG. 3 shows a schematic side view of the head of the vegetation cutting device with the guide wheel in an extended position.

When the user-actuated pedal 23 is operated, the guide wheel 20, is released and the spring 30 urges the guide wheel 20 into the extended position as shown in FIG. 3. FIG. 3 shows a schematic side view of the string trimmer 10 with the guide wheel 20 in the extended position. The spring 30 has expanded and forced a portion of the guide wheel carrier 22 from the conduit 26. The guide wheel 20 can be rested on the ground to support the weight of the string trimmer 10.

In some embodiments, there may be no biasing means 30 but the guide wheel 20 is manually extended by the user. The guide wheel 20 may be kept in the extended or retracted position with detents (not shown) in the guide wheel carrier 22 and reciprocating retaining protrusions (not show) in the wall of the conduit 26. In this way the user can extend or retract the guide wheel until they hear or feel the guide wheel slotting in to place.

Figure 5:
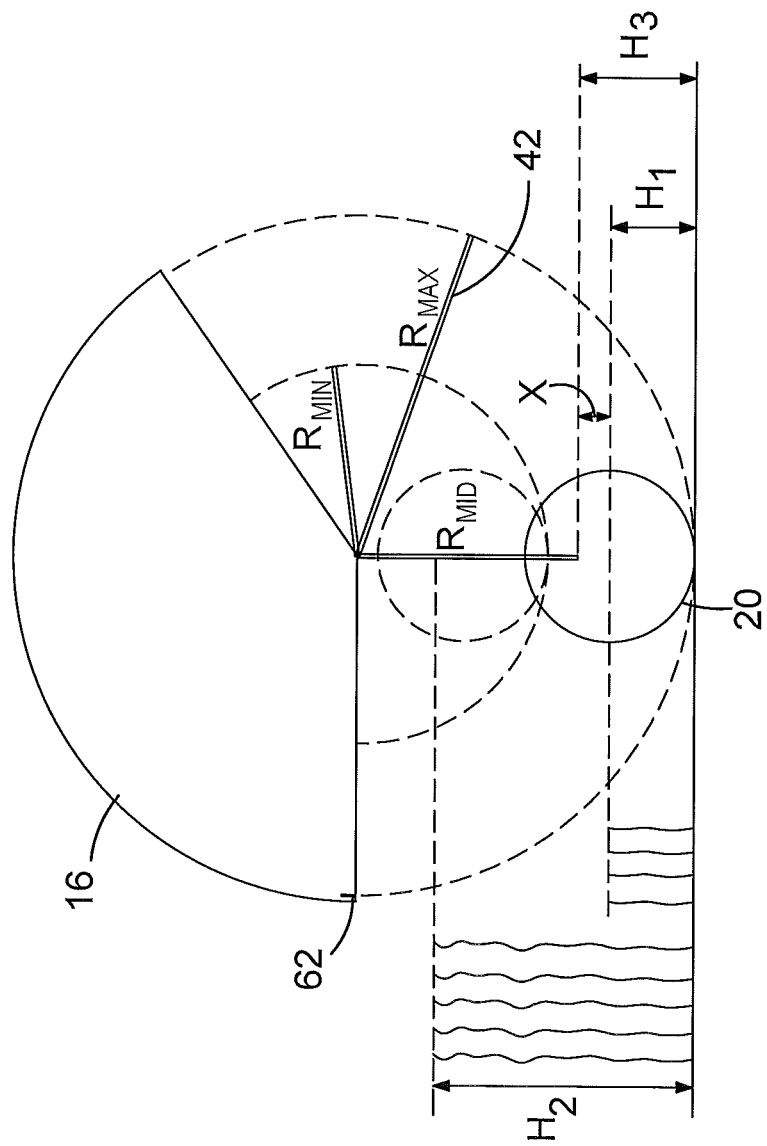
FIG. 5 shows a schematic side view of the head of the vegetation cutting device in use.

Use of the string trimmer with the guide wheel will now be discussed in reference to FIG. 5. FIG. 5 discloses a schematic side view of the string trimmer comparing the position of the guide wheel 20 in the extended and retracted position.

Typically, the cutting line 42 can have different lengths sweeping out a cutting swath having a radius ranging from a maximum length Rmax to a minimum length Rmin as shown in FIG. 5. Rmax is a radius which is approximately equal to the radius of the guard 16. When the cutting line exceeds a length Rmax, a blade 62 mounted on the edge of the guard 16 trims the cutting line 42 so that the cutting line has a length approximately equal to Rmax. The lengths of the cutting line 42 mentioned hereinafter are the lengths of the free end of the cutting line protruding from the cutting head.

Rmin is the minimum operational length the cutting line 42 will rotate in the cutting head without more cutting line being dispensed. When a radius of the cutting swath is below Rmin and is below a threshold feed length. When the cutting line 42 has a length which is equal to or less than the feed length, the counterweight bob 86 does not balance the cutting line 42 and the counterweight bob actuates the line feeding mechanism 50 to feed out more cutting line 42. When the free end of the cutting line protruding from the cutting head is shorter than the feed length, more cutting line will be dispensed.

In use the string trimmer 10 the length of the cutting line 42 and hence the radius of the cutting swath will depend on whether a portion of the cutting line 42 has broken off or the feeding mechanism 50 has fed more cutting line 42 out.

FIG. 5 shows the guide wheel 20 resting on the ground. When the cutting line 42 has a cutting swath with a radius equal to Rmax, the free end of the cutting line protruding from the cutting head just touches the same ground. In other words the edge of the guide wheel 20 extends the same extent as the free end of the cutting line 42 when the cutting line is extended to its maximum operational length. This means that the cutting line 42 can cut vegetation, such as grass, which is at a height H1 and H2.

In some embodiments the guide wheel 20 in the extended position can be extended such that the guide wheel 20 extends beyond Rmax (not shown). In this embodiment the vegetation can be trimmed whilst leaving some vegetation behind. In other embodiments the guide wheel 20 in the extended position can be extended such that the guide wheel 20 extends beyond Rmin, but not as far as Rmax (not shown). In this embodiment the cutting line will extend beyond the edge of the guide wheel and the cutting line 42 can cut grass which extends below the level of the ground on which the guide wheel 20 is resting. For example, if grass is growing out at the edge of a flowerbed, but also downwards below the level of the lawn, the cutting line 42 can still cut the grass below the edge of the guide wheel 20. In other embodiments the amount of extension of the guide wheel 20 can be adjusted to vary the relative distance between the cutting line and the guide wheel 20. The guide wheel mechanism 21 can comprise means (not shown) for adjusting the guide wheel extension. In some embodiments the means for adjusting the extension can be a user operated knob which is operatively connected to a screw thread for adjusting the relative position of the stop member 39 with respect to wall of the conduit 26. In some embodiments, the means for adjusting the extension can be any means suitable for adjusting the guide wheel extension.

FIG. 5 also shows the cutting line 42 having a minimum operational length defining a cutting swath of radius Rmin. When the cutting length is equal to Rmin, the cutting 42 can trim vegetation has a height of H2, but not H1. If the cutting line were to break and reduce the length of the cutting line even more, then the feeding mechanism 50 will dispense more cutting line 42 since the cutting line 42 is less than or equal to the feeding length.

In some circumstances the cutting line 42 will break, but the remaining length of the cutting line 42 will be of a length such that the cutting swath has a radius Rmid between Rmax and Rmin. In this situation, the cutting line 42 can trim vegetation at a height H2 but not H1. Furthermore the mass of the cutting line 42 at Rmid will balance the feeding mechanism 50 and no extra cutting line 42 is fed out. This means that in some circumstances the cutting line will not be long enough to trim the grass which is shorter than H3. That is, there is a clearance x between the top of the vegetation and the free end of the cutting line 42.

Since the guide wheel 20 is sprung by virtue of the spring 30, the user is able to push down on the string trimmer 10. This means that the user can compress the spring 30 and reduce the distance between the free end of the cutting line 42 and the top of the vegetation. The user can then bring the free end of the cutting 42 into contact with the vegetation and still continue to cut the vegetation even though the cutting line 42 is sweeping out a cutting swath with a radius less than Rmax.

The user can compress the spring 30 until the guide wheel 20 is close to or in the retracted position. This means that even if the cutting line 42 has the minimum length Rmin, the cutting line 42 will still be able to cut the vegetation when the user pushes the guide wheel 20 towards the retracted position.

In some embodiments when the guide wheel 20 in the retracted position the distance of outer surface of the guide wheel 20 for engaging the ground from the cutting head is equal to the feed length.

In practice the feed length may need to incorporate a tolerance range whereby the feeding mechanism 50 will feed more cutting line when the free end of the cutting line 42 is within a range of cutting line lengths. The tolerance range is between a lower feed length and an upper feed length. In some circumstances small variations in the system need to be accounted for. For example friction acting on the counterweight bob may vary depending on the speed and current operation of the vegetation cutting device. The tolerance range is such that the lower feeding length is equal to the distance of the outer surface of the guide wheel 20 for engaging the ground from the cutting head when the guide wheel 20 is in the retracted position. The upper feeding length is longer than the lower feeding length. In this way the guide wheel 20 when in the retracted position is just retracted past Rmin. This means that the edge of the guide wheel 20 when the guide wheel 20 is retracted is equal with Rmin or is retracted past Rmin. The distance of the outer surface of the guide wheel 20 for engaging the ground from the cutting head when the guide wheel 20 is in the retracted position is less than the feed lengths in the tolerance range. This means that the feeding mechanism 50 will always be able to feed more cutting line out when the guide wheel is in the retracted position.

This means that even when the guide wheel 20 is in the retracted position, the guide wheel 20 and the cutting line length will abut vegetation or other solid objects in the edging mode approximately at the same time. However since the upper feed length extends just past the outermost surface of the guide wheel, the feeding mechanism is still able to dispense more line. However, even if a user were to force the string trimmer 10 against the vegetation, the guide wheel 20 will take the strain and the centrifugal force on the cutting line will not be reduced. Since the guide wheel 20 prevents the cutting head being placed immediately adjacent to solid objects, the cutting line will not feed out continuously and then wrap round the cutting head. Instead only small portions of cutting line will break off against the solid object. The feeding mechanism 50 will still operate whatever position the guide wheel is in. The feeding mechanism 50 is not unbalanced because load is reduced on the cutting line 42 and the feeding mechanism 50 does not dispense cutting line 42 unnecessarily.

Even if the user compresses the spring 30 of the string trimmer 10 such that the guide wheel 20 is moved from the extended position to the retracted position when the length of the cutting line is at Rmax, the centrifugal force on the cutting line 42 is not reduced such that the feeding mechanism feeds more line out. This is because some of the cutting line will be bent by the object, but a proportion of the cutting line 42, e.g. a length Rmin of the cutting line 42 exerts a centrifugal force and contributes to the unwinding force. In this way the unwinding force of the cutting line 42 will balance against the biasing force of counterweight bob 86.

Embodiments of the present invention have been discussed with particular reference to the examples illustrated. However it will be appreciated that variations and modifications may be made to the examples described within the scope of the invention.

The invention claimed is:

1. A vegetation cutting device comprising:
    a rotating cutting head having a cutting line, the cutting line arranged to define a swath for cutting vegetation;
    a cutting line feeding mechanism comprising a counterweight for balancing a free end of the cutting line protruding from the cutting head, the counterweight being configured to actuate the cutting line feeding mechanism and feed more cutting line when the length of free end the cutting line is shorter than or equal to a feed length; and
    a guide wheel mounted on the vegetation cutting device and having an outer surface for engaging the ground, the guide wheel being moveable between a retracted position and an extended position wherein when the guide wheel is in the retracted position, the feed length is equal to or less than a radius of the outer surface of the guide wheel engaging the ground.

2. The vegetation cutting device according to claim 1 wherein the vegetation cutting device comprises a guard and the outer surface of the guide wheel in the extended position is configured to be at a radius substantially equal to the radius of the guard.

3. The vegetation cutting device according to claim 1 wherein when the guide wheel is in the extended position, the distance between an outer surface of the guide wheel engaging the ground and the cutting head is greater than the feed length.

4. The vegetation cutting device according to claim 1 wherein the feed length varies within a tolerance length range between a feed length which is equal to a distance between a portion of the outer surface of the guide wheel engaging the ground in the retracted position and the cutting head and a feed length which extends a predetermined distance beyond the outer surface of the guide wheel in the retracted position.

5. The vegetation cutting device according to claim 1 wherein the guide wheel is linearly spring biased to the extended position.

6. The vegetation cutting device according to claim 2 wherein the guide wheel is mounted on a guide wheel carrier which moves linearly with respect to the guard mounted to the vegetation cutting device.

7. The vegetation cutting device according to claim 6 wherein the string trimmer comprises a latch mechanism for releasably locking the guide wheel in the retracted position.

8. The vegetation cutting device according to claim 7 wherein the latch mechanism comprises a latch mounted on the guard for interlocking with a catch mounted on the guide wheel carrier.

9. The vegetation cutting device according to claim 1 wherein the guide wheel is moveable along a path intersecting the axis of rotation of the rotating cutting head.

10. The vegetation cutting device according to claim 9 wherein the rotating cutting head is operable in an edging mode whereby the plane of the swath of the cutting line is substantially vertical and the path is substantially vertical.

11. A vegetation cutting device comprising:

a rotating cutting head having a cutting line, the cutting line arranged to define a swath for cutting vegetation;

a cutting line feeding mechanism comprising a counterweight for balancing a free end of the cutting line protruding from the cutting head, the counterweight being configured to actuate the cutting line feeding mechanism and feed more cutting line when the length of free end the cutting line is shorter than or equal to a feed length;

a guide wheel mounted on the vegetation cutting device and having an outer surface for engaging the ground, the guide wheel being moveable between a retracted position and an extended position wherein when the guide wheel is in the retracted position, the feed length is equal to a distance between the outer surface of the guide wheel engaging the ground and the cutting head;

wherein the string trimmer comprises a latch mechanism for releasably locking the guide wheel in the retracted position; and wherein the latch mechanism comprises a foot-actuated pedal for operating the latch mechanism.

* * * * *